United States Patent
Yoshino

(10) Patent No.: US 9,927,030 B2
(45) Date of Patent: Mar. 27, 2018

(54) MECHANICAL SEAL

(71) Applicant: EAGLE INDUSTRY CO., LTD., Tokyo (JP)

(72) Inventor: Akira Yoshino, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 253 days.

(21) Appl. No.: 15/022,127

(22) PCT Filed: Jan. 15, 2015

(86) PCT No.: PCT/JP2015/050938
§ 371 (c)(1),
(2) Date: Mar. 15, 2016

(87) PCT Pub. No.: WO2015/108107
PCT Pub. Date: Jul. 23, 2015

(65) Prior Publication Data
US 2016/0230892 A1    Aug. 11, 2016

(30) Foreign Application Priority Data
Jan. 17, 2014    (JP) .................................. 2014-006490

(51) Int. Cl.
*F16J 15/34*    (2006.01)
*F16J 15/36*    (2006.01)
(Continued)

(52) U.S. Cl.
CPC .......... *F16J 15/164* (2013.01); *F04D 29/126* (2013.01); *F04D 29/128* (2013.01); *F16J 15/348* (2013.01);
(Continued)

(58) Field of Classification Search
CPC .. F16J 15/3448; F16J 15/3452; F16J 15/3464; F16J 15/348; F16J 15/36; F04C 29/12; F04C 29/126
See application file for complete search history.

(56) References Cited

U.S. PATENT DOCUMENTS 2,474,123 A * 6/1949 Schmitz ................... F16J 15/36
277/373
2,785,913 A * 3/1957 Solari ...................... F16J 15/36
277/391
(Continued)

FOREIGN PATENT DOCUMENTS

DE    4115115 A1    3/1992
EP    1577591 A1    9/2005
(Continued)

*Primary Examiner* — Nicholas L Foster
(74) *Attorney, Agent, or Firm* — Harness, Dickey & Pierce, P.L.C.

(57) ABSTRACT

The object of the present disclosure is to accomplish a stable sealing performance while maintaining the durability. A mating ring (120) includes a sliding portion (121) having a sliding surface that slides against a sealing ring (110) within an end surface on an atmosphere side (A) thereof in an axial direction of a shaft (200), and a retained portion (122) that extends from a radially outward end portion of the sliding portion (121) toward a sealed-fluid side (F) in the axial direction and is retained by a sleeve (130). A mechanical seal (100) includes an annular holder (500) that is fixed to the sleeve (130) receives pressure from an O-ring (140) that receives, from the sealed-fluid side (F) in the axial direction, a fluid pressure (P) of a fluid to be sealed that flew into a space created by a flange portion (132) of the sleeve (130) and the retained portion (122) of the mating ring (120).

2 Claims, 6 Drawing Sheets

(51) Int. Cl.
*F16J 15/38* (2006.01)
*F04D 29/12* (2006.01)
*F16J 15/16* (2006.01)
*F04D 1/00* (2006.01)

(52) U.S. Cl.
CPC ....... *F16J 15/3448* (2013.01); *F16J 15/3452* (2013.01); *F16J 15/3464* (2013.01); *F16J 15/36* (2013.01); *F16J 15/38* (2013.01); *F04D 1/00* (2013.01)

(56) References Cited

U.S. PATENT DOCUMENTS

| | | | | |
|---|---|---|---|---|
| 4,779,876 A | * | 10/1988 | Novosad | F16J 15/348 277/375 |
| 5,123,660 A | | 6/1992 | Dahlheimer et al. | |
| 5,199,719 A | * | 4/1993 | Heinrich | F16J 15/36 277/374 |
| 6,145,841 A | * | 11/2000 | Maeda | F16J 15/348 277/358 |
| 6,398,223 B1 | * | 6/2002 | Radosav | F16J 15/3452 277/352 |
| 6,523,832 B1 | * | 2/2003 | Nakano | F16J 15/348 277/370 |
| 6,805,357 B2 | * | 10/2004 | Dahlheimer | F16J 15/3468 277/358 |
| 2015/0211638 A1 | * | 7/2015 | Itadani | F16J 15/34 277/367 |

FOREIGN PATENT DOCUMENTS

| | | |
|---|---|---|
| JP | H0441160 U | 4/1992 |
| JP | 2004-516427 A | 6/2004 |
| JP | 2011-074966 A | 4/2011 |
| WO | 02/16810 A1 | 2/2002 |

* cited by examiner

MECHANICAL SEAL

CROSS-REFERENCE TO RELATED APPLICATIONS

This application is a National Stage of International Application No. PCT/JP2015/050938, filed Jan. 15, 2015 (now WO 2015/108107 A1), which claims priority to Japanese Application No. 2014-006490, filed Jan. 17, 2014. The entire disclosures of each of the above applications are incorporated herein by reference.

FIELD

The present disclosure relates to a mechanical seal.

BACKGROUND

Conventionally, there has been known a water pump for an automobile in which a mechanical seal is attached for sealing an annular gap between a housing and a shaft. Attaching a mechanical seal in this manner separates inside of the housing into a sealed-fluid side (pump chamber) where fluid to be sealed is sealed, and an atmosphere side (bearing chamber).

In the recent years, due to an increase in the optimal operation temperature range for the purpose of improving the thermal efficiency of an engine, reduction in size of the water pump and increase in the rotational speed of the water pump for the purpose of achieving high performance, there is a trend of increasing the pressure of the sealed-fluid side (pump chamber).

The increase in the pressure of the sealed-fluid side creates a difference in pressure balance between a rotating side and a stationary side of the mechanical seal, causing a cup gasket for sealing an annular gap between a sleeve and a mating ring (rotating ring) at the rotating side to move in the axial direction. Such movement of the cup gasket may make the sealing performance unstable.

CITATION LIST

Patent Literature

Patent Literature 1: Japanese Patent Application Laid-open No. 2011-74966

SUMMARY

Technical Problem

Patent Literature 1 discloses a configuration of a mechanical seal that has a mating ring on a rotating side and a sealing ring on a stationary side slide against each other, in which the inner diameter R2 of the mating ring 120 is set to be equal to or greater than the minimum diameter R3 of the outer diameter of the bellows made of rubber so that the pressure applied to the mating ring 120 from the sealed-fluid side in the axial direction is reduced.

The configuration of the mechanical seal of Patent Literature 1 is now described in detail with reference to FIGS. 6A and 6B, while comparing with a configuration of a conventional mechanical seal. FIG. 6A is a schematic cross-sectional diagram showing the configuration of the conventional mechanical seal. FIG. 6B is a schematic cross-sectional diagram showing the configuration of the mechanical seal of Patent Literature 1.

The mechanical seal is configured such that a mating ring 120 that is fixed on a shaft 200 side and functions as a rotating ring, and a sealing ring 110 that is fixed on a housing 300 side and functions as a stationary ring slide against each other as the mating ring 120 rotates with a rotation of the shaft 200. Note that within an end surface of the mating ring 120 and an end surface of the sealing ring 110, portions that slide against each other are defined as "sliding surfaces." As shown in FIGS. 6A and 6B, the maximum diameter of the sliding surfaces is defined as "R1," the inner diameter of the mating ring 120 as "R2," and a minimum diameter of an outer diameter of a rubber bellows 170 as "R3."

As described in Patent Literature 1, by setting R2 to be equal to or greater than R3, the difference in pressure balance between the rotating side and stationary side of the mechanical seal can be reduced. This is because, by setting R2 to be equal to or greater than R3, an excessive force of the pressure of the fluid to be sealed that presses the mating ring 120 against the stationary side in the axial direction can be limited at the most, as little as a ring-shaped area between an inner diameter of a cup gasket 40 and the inner diameter of the mating ring 120.

However, in order to set R2 to be equal to or greater than R3, the diameter of the mating ring 120 needs to be greater than that of the configuration of the conventional example shown in FIG. 6A (see FIG. 6B). Since the increase in the diameter of the mating ring 120 leads to an increase in the circumferential speed thereof, wear of the sliding surfaces may more likely to occur, thereby causing a possible degradation in durability The object of the present disclosure, therefore, is to accomplish a stable sealing performance while maintaining the durability.

Solution to Problem

The present disclosure employs the following means in order to achieve the foregoing object.

Specifically, a mechanical seal according to the present disclosure is a mechanical seal for sealing an annular gap between a rotating shaft and a housing to separate inside of the housing into a fluid side where fluid to be sealed is sealed and an atmosphere side, the mechanical seal including: a rotating ring that rotates with the rotating shaft; a stationary ring that is fixed to the housing and provided on the atmosphere side of the rotating ring in an axial direction of the rotating shaft; an annular sleeve including a tubular shaft fixing portion having an inner circumferential surface fixed to an outer circumferential surface of the rotating shaft, a flange portion extending radially outward from an end portion of the shaft fixing portion that is located on the fluid side in the axial direction, and a rotating ring retaining portion that retains the rotating ring; an annular first sealing member that seals an annular gap between the rotating ring and the sleeve; an annular cartridge including a tubular housing fixing portion having an outer circumferential surface fixed to an inner circumferential surface of the housing, a flange portion extending radially inward from an end portion of the housing fixing portion that is located on the atmosphere side in the axial direction, and a stationary ring retaining portion extending from a radially inward end portion of the flange portion toward the fluid side in the axial direction to retain the stationary ring; and an annular second sealing member including a pressure receiving portion that receives, from the atmosphere side in the axial direction, a fluid pressure of the fluid to be sealed that flew into the housing fixing portion and transmits the fluid pressure to the stationary ring, the annular second sealing member sealing an annular gap between the stationary ring and the stationary ring retaining portion, wherein the rotating ring includes a sliding portion having a sliding surface that slides against the stationary ring within an end surface on the atmosphere side thereof in the axial direction, and a retained portion that extends from a radially outward end portion of the sliding portion toward the fluid side in the axial direction and is retained by the rotating ring retaining portion, and the mechanical seal further includes an annular pressure receiving member that is fixed to the sleeve or provided integrally with the sleeve and receives pressure from the first sealing member that receives, from the fluid side in the axial direction, a fluid pressure of the fluid to be sealed that flew into a space created by the flange portion of the sleeve and the retained portion.

According to the foregoing configuration, the pressure receiving portion of the second sealing member receives force in a direction from the atmosphere side toward the sealed-fluid side in the axial direction, by means of the fluid pressure of the fluid to be sealed flew into the tubular housing fixing portion of the cartridge. The fluid pressure received by the pressure receiving portion is transmitted to the stationary ring, and the stationary ring presses the rotating ring in the direction from the atmosphere side toward the sealed-fluid side in the axial direction. On the other hand, the first sealing member receives force in a direction from the sealed-fluid side toward the atmosphere side in the axial direction, by means of the fluid pressure of the fluid to be sealed flew into the space formed by the flange portion of the sleeve and the retained portion of the rotating ring. Note that the pressure receiving member is fixed to the sleeve or provided integrally with the sleeve, and the first sealing member receives the fluid pressure; hence, the pressure receiving member receives force from the first sealing member. Therefore, the force that is received by the first sealing member in the direction from the fluid side toward the atmosphere side in the axial direction by means of the fluid pressure of the fluid to be sealed is not transmitted to the rotating ring. Accordingly, the force of the rotating ring pressing the stationary ring from the fluid side toward the atmosphere side in the axial direction by means of the fluid pressure of the fluid to be sealed acts only on the ring-shaped area between the maximum diameter of the sliding surfaces and the inner diameter of the retained portion of the rotating ring. For this reason, even when the fluid pressure of the fluid to be sealed increases, the force of the rotating ring pressing the stationary ring is prevented from becoming excessively large.

In addition, according to the foregoing configuration, an axial movement of the first sealing member is regulated due to the presence of the pressure receiving member; hence, the sealing performance is prevented from becoming unstable due to the axial movement of the first sealing member. Moreover, according to the foregoing configuration, because the diameter of the rotating ring does not need to be increased as in the configuration described in Patent Literature 1, it is possible to prevent an increase of the circumferential speed of the rotating ring, to suppress wear of the sliding surface against the stationary ring, and to maintain the durability.

In addition, it is preferable that a length of an inner circumferential diameter of the retained portion of the rotating ring is equal to or greater than a length of a minimum diameter of the pressure receiving portion of the second sealing member. According to this configuration, the force of the rotating ring pressing the stationary ring by means of the fluid pressure of the fluid to be sealed does not become greater than the force of the stationary ring pressing the rotating ring.

Advantageous Effects of the Disclosure

As described above, according to the present disclosure, it is possible to accomplish a stable sealing performance while maintaining the durability.

DRAWINGS

DETAILED DESCRIPTION

Hereinafter, modes for carrying out the present disclosure will be exemplarily described in detail based on examples thereof with reference to the drawings. However, the dimensions, materials, shapes, relative arrangements and so on of constituent parts described in the examples are not intended to limit the scope of the present disclosure to these alone in particular unless specifically described.

EXAMPLES

Mechanical seals according to examples of the present disclosure are now described with reference to FIGS. 1 to 5.

<Application Example of Mechanical Seal>

Figure 1:
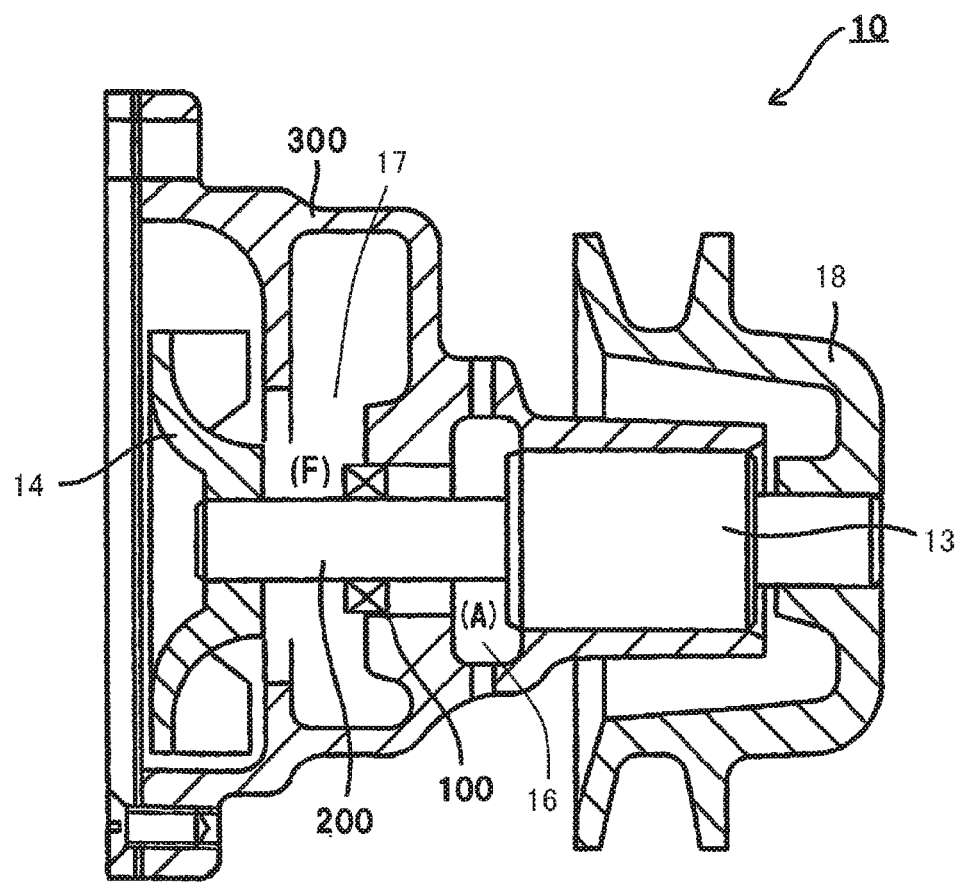
FIG. 1 is a schematic cross-sectional diagram showing a water pump to which a mechanical seal of an example of the present disclosure is applied.

An application example of a mechanical seal 100 according to an example of the present disclosure is described first with reference to FIG. 1. FIG. 1 is a schematic cross-sectional diagram showing a water pump 10 as a fluid pump to which the present disclosure is applied. As shown in FIG. 1, a shaft 200 functioning as a rotating shaft is supported rotatably by a bearing 13 in a tubular water pump housing 300 (simply referred to as "housing," hereinafter) configuring a case of the water pump 10. An impeller 14 is fixed to a left end of the shaft 200 in FIG. 1, and a pulley 18 is fixed to a right end of the same in FIG. 1, obtaining driving power from an external drive source, not shown. The mechanical seal 100 between the housing 300 and the shaft 200 separates inside of the housing 300 into a bearing chamber 16 (atmosphere (A) side) which is an atmosphere chamber where the bearing 13 is located, and a pump chamber 17 (sealed-fluid (F) side) which is a fluid chamber where the impeller 14 is located. When the impeller 14 rotates, the water pump 10 pumps out a coolant that fills the pump chamber 17 to cool the external drive source.

Example 1

<Configuration of Mechanical Seal>

Figure 2:
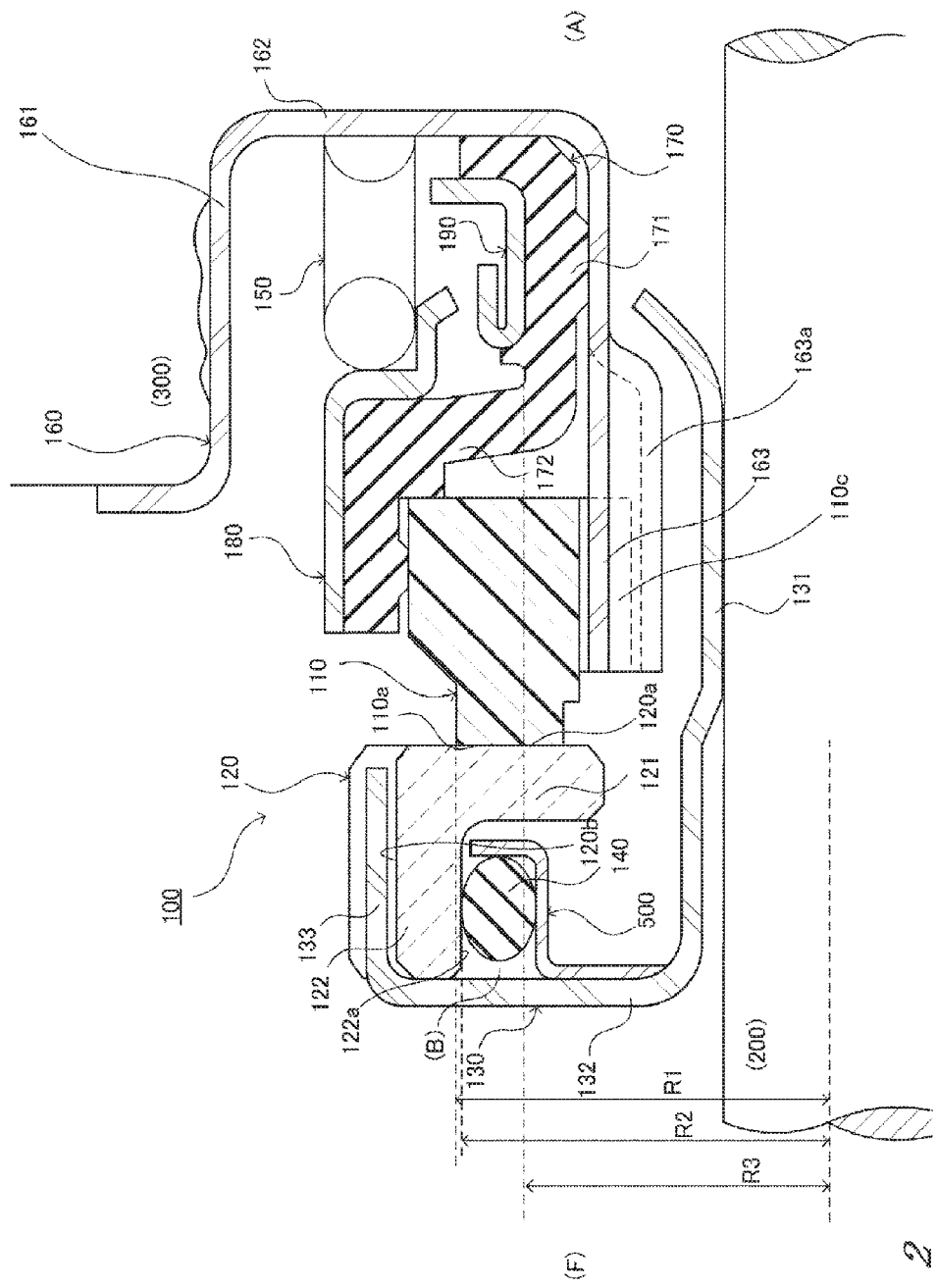
FIG. 2 is a schematic cross-sectional diagram showing an installed state of the mechanical seal according to Example 1 of the present disclosure.
Figure 3:
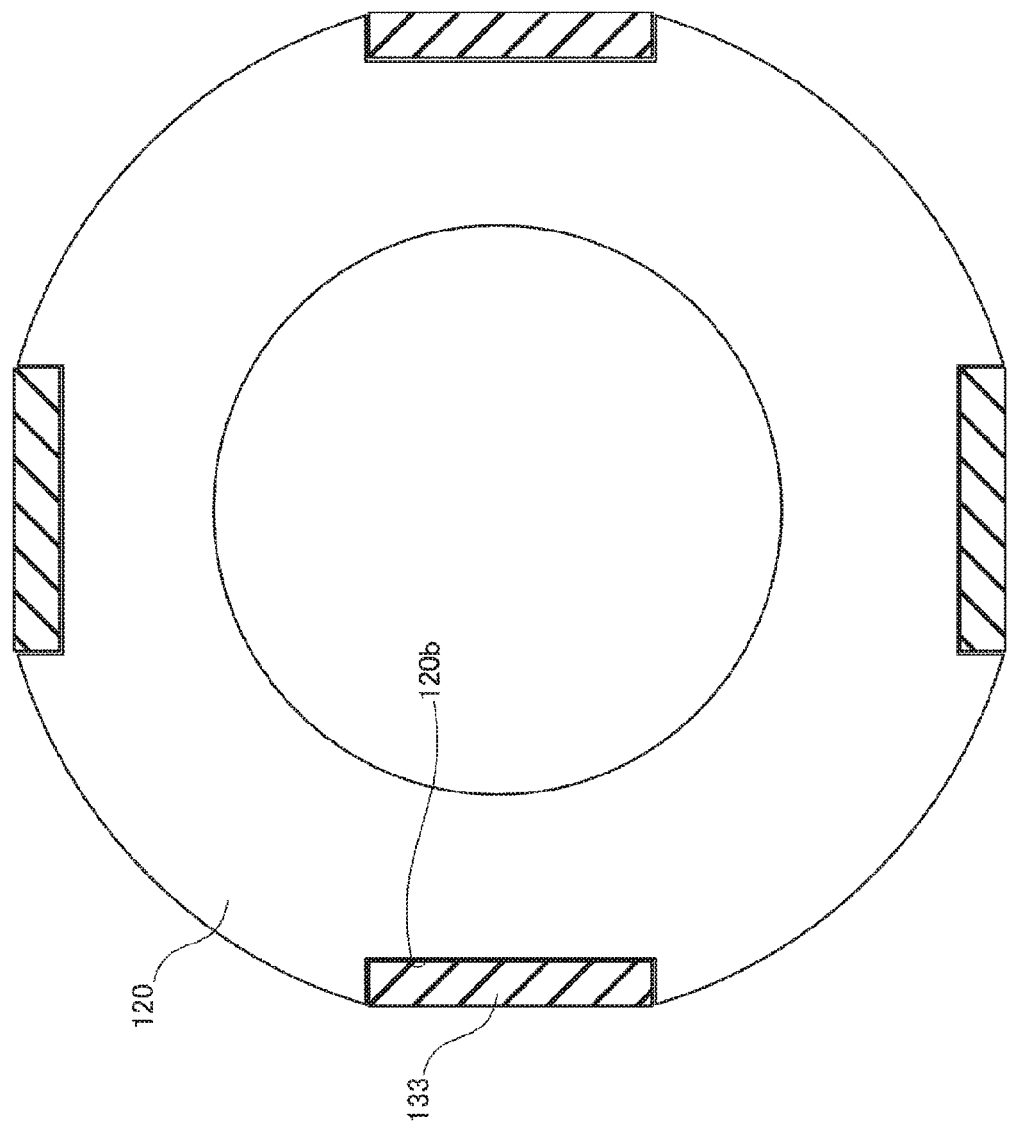
FIG. 3 is a diagram for explaining an engagement between a sleeve and a mating ring.

The mechanical seal according to Example 1 of the present disclosure is described with reference to FIGS. 2 and 3. FIG. 2 is a schematic cross-sectional diagram showing an installed state of the mechanical seal according to Example 1 of the present disclosure. FIG. 3 is a diagram for explaining an engagement between a sleeve and a mating ring, the diagram being a cross-sectional diagram showing the mechanical seal in a shaft axis direction (simply referred to as "axial direction," hereinafter).

The mechanical seal 100 seals an annular gap between the shaft 200 and the housing 300 to prevent the fluid to be sealed in the housing 300 from leaking to the outside. The mechanical seal 100 separates inside of the housing 300 into the sealed-fluid (F) side which is the fluid side where the fluid to be sealed is sealed, and the atmosphere (A) side. As shown in FIG. 2, the left-hand side with respect to the mechanical seal 100 is the sealed-fluid (F) side, and the right-hand side with respect to the mechanical seal 100 is the atmosphere (A) side. Note that the fluid to be sealed described in the present embodiment is the coolant mentioned above.

The mechanical seal 100 has a sealing ring 110 that is a stationary ring fixed to the housing 300, a mating ring 120 that is a rotating ring rotating together with the shaft 200, and a spring 150 that is a pressing member pressing the sealing ring 110 against the mating ring 120. Note that the spring 150 is provided between a flange portion 162 of a cartridge 160, described hereinafter, and a case 180, and presses the sealing ring 110 against the mating ring 120 via the case 180 and a rubber bellows 170.

The sealing ring 110 is provided on the atmosphere (A) side of the mating ring 120 in the axial direction. Due to the rotation of the shaft 200, an end surface 110a of the sealing ring 110 and an end surface 120a of the mating ring 120 slide against each other. Portions of these end surfaces that slide against each other are referred to as "sliding surfaces." By causing the end surface of the sealing ring 110 and the end surface of the mating ring to slide against each other, the fluid to be sealed is sealed so that it does not leak to the atmosphere (A) side.

In addition, the mechanical seal 100 has a sleeve 130 that is fixed to the shaft 200. The sleeve 130 has a tubular shaft fixing portion 131 having an inner circumferential surface fixed to an outer circumferential surface of the shaft 200, and a flange portion 132 that extends radially outward from an end portion of the shaft fixing portion 131 that is located on the sealed-fluid (F) side in the axial direction. The sleeve 130 also has a rotating ring retaining portion 133 that extends from a radially outward end portion of the flange portion 132 toward the atmosphere (A) side in the axial direction to retain the mating ring 120. According to the present example, the rotating ring is configured to extend from the radially outward end portion of the flange portion 132 toward the atmosphere (A) side in the axial direction, as shown in FIG. 2; however, the present disclosure is not limited to this configuration. In other words, instead of extending toward the atmosphere (A) side in the axial direction, the rotating ring retaining portion may extend in the same direction as the flange 132.

As shown in FIG. 3, a plurality of grooves 120b extending in the axial direction are formed on an outer circumferential surface of the mating ring 120. In the present example, four of these grooves 120b are formed. The rotating ring retaining portion 133 of the sleeve 130 comes into engagement with the grooves 120b, and thereby the sleeve 130 retains the mating ring 120. By retaining the mating ring 120 by means of the sleeve 130, the mating ring 120 functioning as a rotating ring rotates in response to the rotation of the sleeve 130 rotating together with the shaft 200.

In addition, as shown in FIG. 2, the mating ring 120 of Example 1 has a sliding portion 121 that has, on the end surface 120a on the atmosphere (A) side in the axial direction, a sliding surface sliding against the sealing ring 110, and a retained portion 122 that extends from a radially outward end portion of the sliding portion 121 toward the sealed-fluid (F) side in the axial direction and is retained by the rotating ring retaining portion 133. The grooves 120b described above are provided on an outer circumferential surface of the retained portion 122 of the mating ring 120.

The mechanical seal 100 according to Example 1 also has an O-ring 140 made of rubber, which functions as a first sealing member for sealing an annular gap between the mating ring 120 and the sleeve 130.

The mechanical seal 100 according to Example 1 further has a holder 500 as an annular pressure receiving member that receives force from the O-ring 140, the holder 500 is fixed to the flange portion 132 of the sleeve 130, and is in contact with the O-ring 140 from the atmosphere (A) side of the O-ring 140 in the axial direction. This holder 500 is provided so as not to come into contact with the mating ring 120. However, the holder functioning as a pressure receiving member may be in contact with the mating ring 120 as long as it can receive the force that comes from the O-ring 140 and can reduce the force transmitted to the mating ring 120.

The O-ring 140 is held between an inner circumferential surface 122a of the tubular retained portion 122 of the mating ring 120 and the holder 500, within a space created by the flange portion 132 of the sleeve 130, the inner circumferential surface 122a, and the holder 500. In this configuration, a gap B is created by the flange portion 132, the sliding portion 121, and the O-ring 140. The fluid to be sealed that flew through the gap between the rotating ring retaining portion 133 of the sleeve 130 and the grooves 120b of the mating ring 120 is present in this gap B.

Note that, in the present example, the holder 500 is welded and fixed to the flange portion 132 of the sleeve 130 by laser beam welding. The method for fixing the holder 500 is not limited to laser beam welding, and other methods such as brazing or gluing may be used as long as the holder 500 can be fixed to the sleeve. Although the present example has described the configuration in which the holder functioning as a pressure receiving member is fixed to the sleeve 130 as an individual element, the configuration of the holder is not limited thereto, and therefore the holder may be integrated with the sleeve 130.

In addition, the mechanical seal 100 according to Example 1 has the cartridge 160 for retaining the sealing ring 110 functioning as a stationary ring. The cartridge 160 has a tubular housing fixing portion 161 having an outer circumferential surface tightly fixed to an inner circumferential surface of the housing 300, and a flange portion 162 that extends radially inward from an end portion of the housing fixing portion 161 that is located on the atmosphere (A) side in the axial direction. The cartridge 160 also has a stationary ring retaining portion 163 that extends from a radially inward end portion of the flange portion 162 toward the sealed-fluid (F) side in the axial direction to retain the sealing ring 110. The gap between the housing fixing portion 161 and the housing 300 is sealed completely with a seal member which is not shown.

A rotation stopping portion 163a that is depressed radially inward is formed on an outer circumferential surface of the stationary ring retaining portion 163 of the cartridge 160, and a projection 110c that projects radially inward is formed on the inner circumferential surface of the sealing ring 110. By causing the projection 110c to be caught on the rotation stopping portion 163a, the sealing ring 110 is prevented from rotating with respect to the cartridge 160. Note that the rotation stopping portion 163a and the projection 110c are shown with the broken lines in FIG. 2.

The mechanical seal 100 according to Example 1 also has the rubber bellows 170 as a second sealing member, which seals an annular gap between the stationary ring retaining portion 163 of the cartridge 160 and the sealing ring 110. The rubber bellows 170 has a close contacting portion 171 that is in close contact with the outer circumferential surface of the stationary ring retaining portion 163 of the cartridge 160, and a pressure receiving portion 172 that projects radially outward from an end portion of the close contacting portion 171 that is located on the sealed-fluid (F) side in the axial direction. The pressure receiving portion 172 receives, from the atmosphere (A) side in the axial direction, the pressure of the fluid to be sealed that flew into the housing fixing portion 161.

The mechanical seal 100 according to Example 1 also has a driving band 190 as an annular fastening member, which fastens (holds) the close contacting portion 171 of the rubber bellows 170 with respect to the housing fixing portion 161 of the cartridge 160. The mechanical seal 100 also has the case 180 that retains the pressure receiving portion 172 of the rubber bellows 170 and receives the pressing force of the spring 150. The driving band 190 and the case 180 regulate the axial movement and radial movement of the rubber bellows 170. According to this configuration, an annular gap between the sealing ring 110 and the cartridge 160 is sealed with the rubber bellows 170. The present example has described the configuration in which the rubber bellows is used as a second sealing member, but the present disclosure is not limited to this configuration.

Above described the sealing ring 110, the spring 150, the rubber bellows 170, the case 180, and the driving band 190, which are the members displaced on a stationary side, are integrated by the cartridge 160 to form a cartridge configuration. Note, in the present example, that the sleeve 130, the cartridge 160, the case 180, and the holder 500 are made of SUS (stainless steel); however, the material of these members is not limited thereto so long as it can withstand stress.

<Advantages of Mechanical Seal of Example 1>

Advantages of the mechanical seal of Example 1 are described next with reference to FIG. 2. The portion of the end surface 120a of the mating ring 120 and the portion of the end surface 110a of the sealing ring 110 that slide against each other are defined as "sliding surfaces," and the maximum diameter of the sliding surfaces as "sliding diameter R1." Also as shown in FIG. 2, the inner circumferential diameter of the retained portion 122 of the mating ring 120 is defined as "R2," and the minimum diameter of the outer diameter of the rubber bellows 170 as "R3."

Once the pressure receiving portion 172 of the rubber bellows 170 receives the force by means of fluid pressure P of the fluid to be sealed, force W1 of the sealing ring 110 pressing the mating ring 120 acts on the ring-shaped area between the sliding diameter R1 and the minimum diameter R3 of the outer diameter of the rubber bellows 170. By using this ring-shaped area S1 $(=(R1^2-R3^2)\pi)$, W1=S1×P is derived. When the spring force of the spring 150 is defined as Ws, the actual force of the sealing ring 110 pressing the mating ring 120 is expressed as W1+Ws.

The fluid pressure P of the fluid to be sealed acts on the O-ring 140, and the holder 500 receives this force acting on the O-ring 140. In this case, the flange portion 132 of the sleeve 130 receives the force because the holder 500 is joined to the flange portion 132. Therefore, force W2 of the mating ring 120 pressing the sealing ring 110 acts on the ring-shaped area between the sliding diameter R1 and the inner circumferential diameter R2 of the retained portion 122 of the mating ring 120. By using this ring-shaped area S2 $(=(R1^2-R2^2)\pi)$, W2=S2×P is derived.

The O-ring 140 receives the fluid pressure P in the direction from the sealed-fluid (F) side toward the atmosphere (A) side, by means of the fluid to be sealed entered the space B. In the present example, however, the force received by the O-ring 140 by means of the fluid pressure P of the fluid to be sealed is not transmitted to the mating ring 120 because the O-ring 140 is retained by the holder 500 that the mating ring 120 comes into contact with at the atmosphere (A) side, and because the holder 500 is not in contact with the sealed-fluid (F) side end surface of the sliding portion 121 of the mating ring 120 in the axial direction. Therefore, in the configuration according to Example 1, W2 is the only force of the mating ring 120 pressing the sealing ring 110. In addition, since S1>S2, W1>W2 is obtained; and hence W1+Ws>W2 is derived. Therefore, even when the fluid pressure P of the fluid to be sealed becomes high, the mating ring 120 does not move toward the sealing ring 110.

In addition, because the holder 500 retains the O-ring 140 to prevent the O-ring 140 from moving from the sealed-fluid (F) side toward the atmosphere (A) side in the axial direction, the O-ring 140 does not move toward the atmosphere side even when the fluid pressure P of the fluid to be sealed becomes high. Therefore, by comparison with the configuration of the conventional example shown in FIG. 6A, the sealing performance in the annular gap between the mating ring 120 and the sleeve 130 becomes stable.

Figures 6A, 6B:
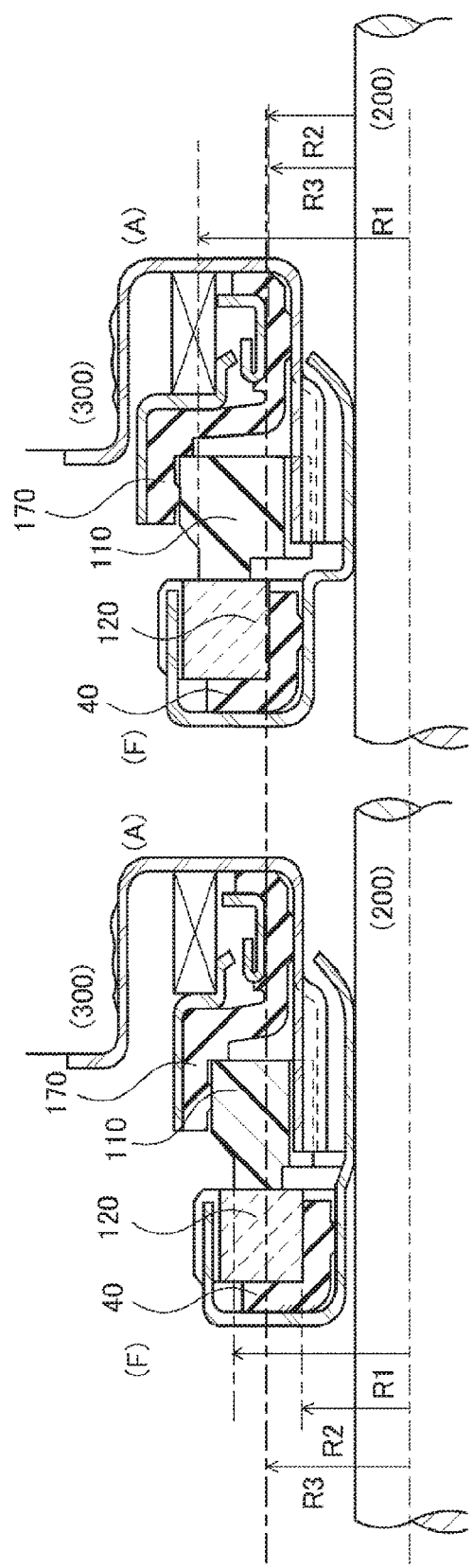
FIGS. 6 is a schematic cross-sectional diagram showing installed states of conventional mechanical seals.

Furthermore, according to Example 1, the outer diameter of the mating ring 120 does not need to be made larger than that of the configuration of the conventional example shown in FIG. 6A. Therefore, the circumferential speed of the mating ring 120 is not greater than that of the configuration shown in FIG. 6B, preventing wear of the sliding surfaces and thus realizing durability.

Note that, the configuration of the present example is shown in FIG. 2 but the present disclosure is not limited thereto. In other words, the effects of the present disclosure can be achieved not only in the configuration shown in FIG. 2 but also in a configuration in which at least the inner circumferential diameter R2 of the retained portion 122 is equal to or greater than the minimum diameter R3 of the outer diameter of the rubber bellows 170. In a case where R2 is equal to R3, W1=$(R1^2-R3^2)\pi \times P$ is obtained, and W2=$(R1^2-R3^2)\pi \times P$ are established. Hence, W1=W2 is derived. Note that, the force of the sealing ring 110 pressing the mating ring 120 is not only formed of W1 caused by the fluid pressure but also Ws caused by the spring 150. Hence, because Ws>0 is obtained, W1+Ws>W2 is derived. As described, the same effects as those of the present example can be accomplished as long as at least R2≥R3 is established. More specifically, regardless of the relationship between R2 and R3, the same effects as those of the present example can be accomplished as long as W1+Ws>W2 is established by adjusting the spring force Ws. In the present example, the holder 500 is provided for the purpose of satisfying this relationship, i.e., for the purpose of making the force of the mating ring 120 pressing the sealing ring 110 lower than the force of the sealing ring 110 pressing the mating ring 120.

The present example has also described the configuration shown in FIG. 2 in which the inner circumferential diameter R2 of the retained portion 122 is less than the sliding diameter R1, but the present disclosure is not limited thereto. In the case of R2≥R1, the force W2 of the mating ring 120 pressing the sealing ring becomes zero. In this case as well, the pressure balance between the mating ring 120 and the sealing ring 110 can be maintained and the effects of the present example can be achieved.

Example 2

Figure 4:
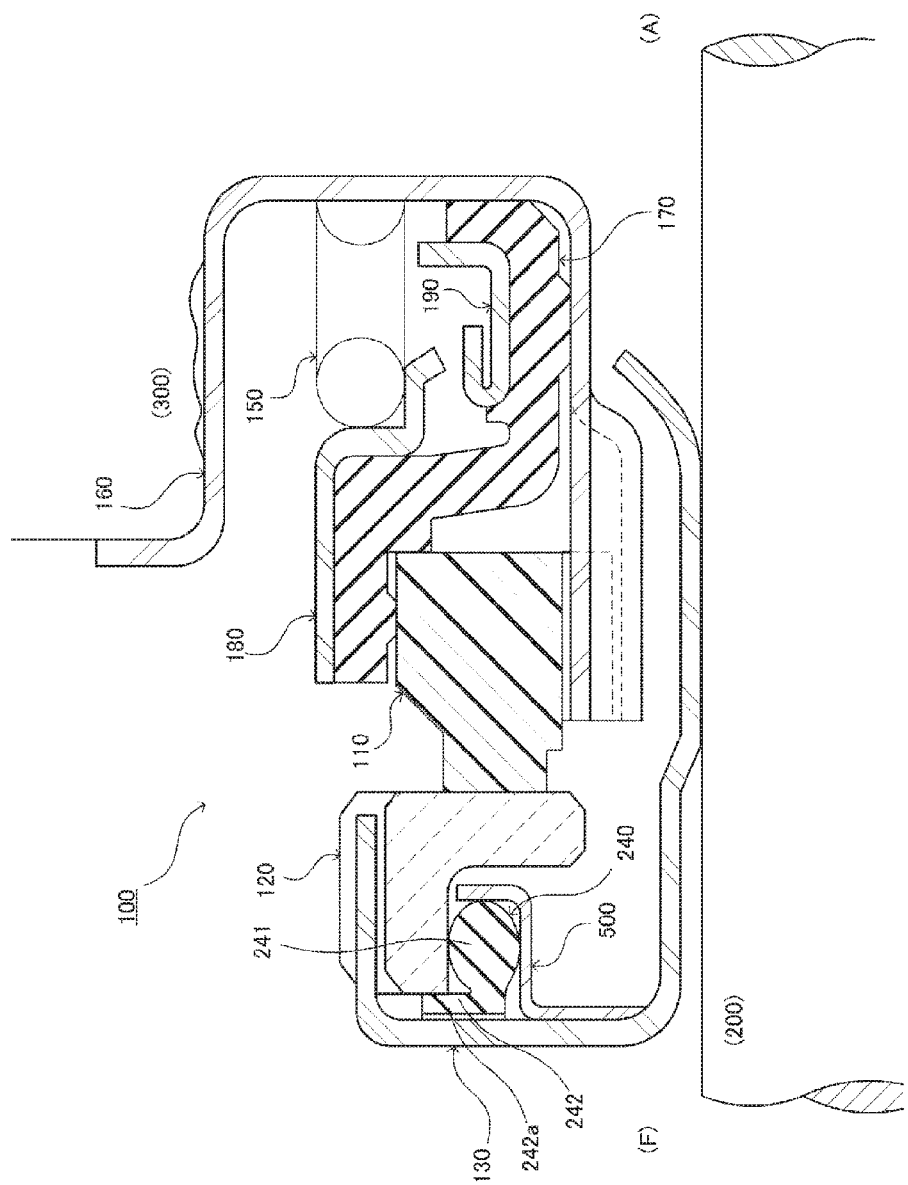
FIG. 4 is a schematic cross-sectional diagram showing an installed state of a mechanical seal according to Example 2 of the present disclosure.

The mechanical seal according to Example 2 of the present disclosure is described next with reference to FIG. 4. FIG. 4 is a schematic cross-sectional diagram showing an installed state of the mechanical seal according to Example 2 of the present disclosure. Example 2 is the same as Example 1 except that the configuration of the first sealing member is different; thus, the same reference numerals are used on the same components and the descriptions thereof are omitted accordingly.

In Example 2, a sealing member 240 having a similar shape to the conventional cup gasket 40 shown in FIG. 6A is used in place of the O-ring 140 used in Example 1. This sealing member 240 has a main body 241 having roughly a ring-shaped cross section and an extending portion 242 extending radially outward from the main body 241. The presence of the extending portion 242 enables a stable positioning of the sealing member 240 in the axial direction, improving the sealing performance in the annular gap between the mating ring 120 and the sleeve 130.

The extending portion 242 is provided with a slit 242a creating a small gap between the extending portion 242 and the flange portion 132 of the sleeve 130, to avoid the impact of the fluid pressure. The presence of the slit 242a prevents the extending portion 242 from being pressed by the fluid pressure of the fluid to be sealed, so the fluid pressure acts on the main body 241 of the sealing member 240.

As described above, Example 2 can achieve the same effects as those of Example 1 while accomplishing the sealing performance of the first sealing member more stably than Example 1.

Example 3

Figure 5:
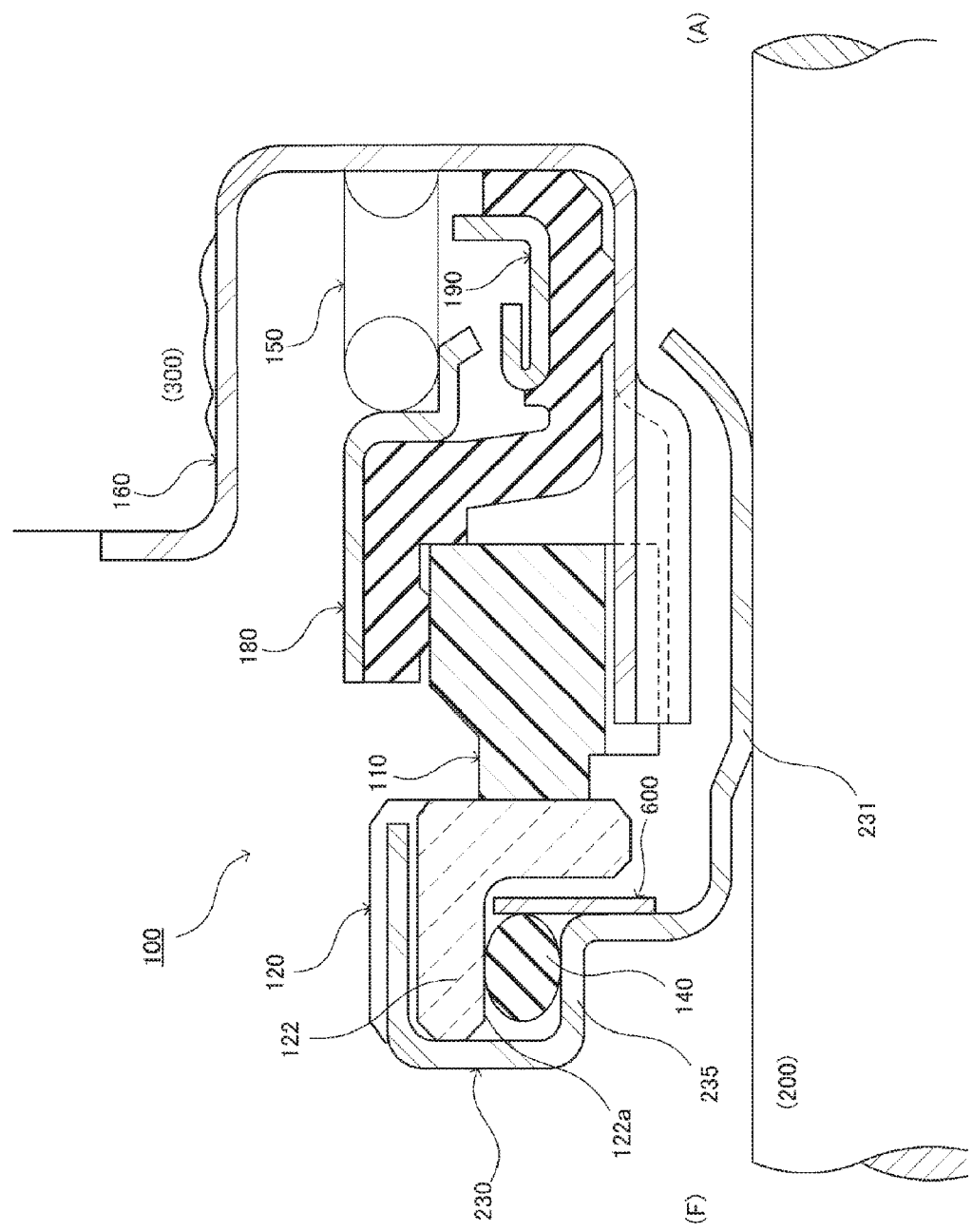
FIG. 5 is a schematic cross-sectional diagram showing an installed state of a mechanical seal according to Example 3 of the present disclosure.

The mechanical seal according to Example 3 of the present disclosure is described next with reference to FIG. 5. FIG. 5 is a schematic cross-sectional diagram showing an installed state of the mechanical seal according to Example 3 of the present disclosure. Example 3 is the same as Example 1 except that the configuration of the holder as a pressure receiving member is different; thus, the same reference numerals are used on the same components and the descriptions thereof are omitted accordingly.

Example 1 has described the configuration in which the O-ring 140 is held in the radial direction in between the inner circumferential surface 122a of the retained portion 122 of the mating ring 120 and the holder 500. The present example describes a configuration in which the O-ring 140 is held in the radial direction in between the inner circumferential surface 122a of the retained portion 122 of the mating ring 120 and a sleeve 230.

As shown in FIG. 5, the sleeve 230 of Example 3 has a step portion 235 with a diameter larger than that of a shaft fixing portion 231. The O-ring 140 is sandwiched in the radial direction between the step portion 235 and the inner circumferential surface 122a of the retained portion 122 of the mating ring 120. A disc-shaped holder 600 is positioned in contact with the O-ring 140, on the atmosphere (A) side of the O-ring 140 in the axial direction.

According to this configuration, the holder 600 is provided on the atmosphere (A) side of the section where the annular gap is sealed with the O-ring 140. For this reason, the holder 600 does not need to be fixed completely hermetically to the sleeve 230. In other words, the holder 600 may be fixed to the sleeve 230 with a fixing method such as spot-welding the several points of the holder 600 along its circumference.

As described above, Example 3 can achieve the same effects as those of Example 1 by fixing the holder 600 functioning as the pressure receiving member to the sleeve 230 by means of a method simpler than that of Example 1.

REFERENCE SIGNS LIST

100: Mechanical seal
110: Sealing ring (stationary ring)
110a: End surface
110c: Projection
120: Mating ring (rotating ring)
120a: End surface
120b: Groove
121: Sliding portion
122: Retained portion
122a: Inner circumferential surface
130, 230: Sleeve
131: Shaft fixing portion
132: Flange portion
133: Rotating ring retaining portion
140: O-ring (first sealing member)
150: Spring (pressing member)
160: Cartridge
161: Housing fixing portion
162: Flange portion
163: Stationary ring retaining portion
163a: Rotation stopping portion
170: Rubber bellows (second sealing member)
171: Close contacting portion
172: Pressure receiving portion
180: Case
190: Driving band
200: Shaft (rotating shaft)
240: Sealing member
241: Main body
242: Extending portion
242a: Slit
300: Housing
500, 600: Holder (pressure receiving member)

The invention claimed is:

1. A mechanical seal for sealing an annular gap between a rotating shaft and a housing to separate inside of the housing into a fluid side where fluid to be sealed is sealed and an atmosphere side, the mechanical seal comprising:
a rotating ring that rotates with the rotating shaft;
a stationary ring that is fixed to the housing and provided on the atmosphere side of the rotating ring in an axial direction of the rotating shaft;
an annular sleeve comprising a tubular shaft fixing portion having an inner circumferential surface fixed to an outer circumferential surface of the rotating shaft, a flange portion extending radially outward from an end portion of the shaft fixing portion that is located on the fluid side in the axial direction, and a rotating ring retaining portion that retains the rotating ring;

an annular first sealing member that seals an annular gap between the rotating ring and the sleeve;

an annular cartridge comprising a tubular housing fixing portion having an outer circumferential surface fixed to an inner circumferential surface of the housing, a flange portion extending radially inward from an end portion of the housing fixing portion that is located on the atmosphere side in the axial direction, and a stationary ring retaining portion extending from a radially inward end portion of the flange portion toward the fluid side in the axial direction to retain the stationary ring; and an annular second sealing member comprising a pressure receiving portion that receives, from the atmosphere side in the axial direction, a fluid pressure of the fluid to be sealed that flew into the housing fixing portion and transmits the fluid pressure to the stationary ring, the annular second sealing member sealing an annular gap between the stationary ring and the stationary ring retaining portion, wherein the rotating ring comprises a sliding portion having a sliding surface that slides against the stationary ring within an end surface on the atmosphere side thereof in the axial direction, and a retained portion that extends from a radially outward end portion of the sliding portion toward the fluid side in the axial direction and is retained by the rotating ring retaining portion, and the mechanical seal further comprises an annular pressure receiving member that is fixed to the sleeve or provided integrally with the sleeve and receives pressure from the first sealing member that receives, from the fluid side in the axial direction, a fluid pressure of the fluid to be sealed that flew into a space created by the flange portion of the sleeve and the retained portion.

2. The mechanical seal according to claim 1, wherein a length of an inner circumferential diameter of the retained portion of the rotating ring is equal to or greater than a length of a minimum diameter of the pressure receiving portion.

* * * * *